United States Patent [19]

Gould et al.

[11] 3,716,570
[45] Feb. 13, 1973

[54] NOVEL HYDROGEN CONTAINING FLUOROALKYL HYPOCHLORITES AND PROCESS FOR THE PREPARATION THEREOF

[75] Inventors: Douglas Eugene Gould, Dover; Lowell Ray Anderson, Parsippany; David Edward Young, Denville; William Burke Fox, Morris Township, Morris County, all of N.J.

[73] Assignee: Allied Chemical Corporation, New York, N.Y.

[22] Filed: June 5, 1969

[21] Appl. No.: 830,864

[52] U.S. Cl..............260/453 R, 424/298, 252/187, 260/463, 260/611, 23/117
[51] Int. Cl..............................................C07c 71/00
[58] Field of Search...................260/453, 618 D, 633

[56] References Cited

UNITED STATES PATENTS 3,324,185  6/1967  Gilbert et al. .........................260/618
3,444,244  5/1969  Newallis et al. .......................260/618

FOREIGN PATENTS OR APPLICATIONS 634,368  11/1963  Belgium ..............................260/633
703,434  2/1954  Great Britain........................260/633

OTHER PUBLICATIONS

Prager et al., "Prep. & Characterization of New Fluoroxy Compounds."

Mayer et al., "Computation of High-Temp. Rate Constants, etc." (1967) CA 69 no. 5606m (1968)
Streng, "The Chem. Props. of Dioxygen Difluoride" (1962) JACS 85 pp. 1,380–1,385 (1963)
Brown, "Electronegativity, Non-Bonded Interaction etc."JACS 83 pp. 36–42 (1961)

*Primary Examiner*—Lewis Gotts
*Assistant Examiner*—G. Hollrah
*Attorney*—Arthur J. Plantamura and Herbert G. Burkard

[57] ABSTRACT

Hydrogen containing fluoroalkyl hypochlorites of the formula:

$$R_3COCl$$

wherein each R may be hydrogen, lower alkyl, aryl and fluoroalkyl with the proviso that at least one R substituent is fluoroalkyl and one R substituent contains at least one hydrogen atom. The alkyl and fluoroalkyl moieties may contain the same or a different number of carbon atoms and each may contain up to six carbon (lower alkyl), in a straight, or branched chain structure and when R contains six carbon atoms, it may represent an alicyclic moiety. These novel hydrogen containing fluoroalkyl hypochlorites can be prepared by reacting the corresponding alcohols with chlorine monofluoride (ClF) in the absence of a catalyst. These compounds are useful as polymerization initiators, chlorinating agents, bleaching agents, and are valuable intermediates for the syntheses of other useful compounds.

13 Claims, No Drawings

NOVEL HYDROGEN CONTAINING FLUOROALKYL HYPOCHLORITES AND PROCESS FOR THE PREPARATION THEREOF

CROSS REFERENCES TO RELATED APPLICATIONS

Co-pending application of D. E. Gould et al., entitled, "Novel Polyhaloorgano Hypochlorites and Process for the Preparation thereof," Ser. No. 734,515, filed June 5, 1968, which disclosure is specifically incorporated herein by reference.

Co-pending application of D. E. Gould et al., entitled, "Novel Tertiary Polyalkyl Hypochlorites and Process for the Preparation thereof," Ser. No. 772,037, filed Oct. 30, 1968, which disclosure is specifically incorporated herein by reference.

BACKGROUND OF THE INVENTION

The hydrogen containing fluorinated hypochlorites represented by this invention, establish a new class of compounds made by reacting the corresponding fluoroalcohol with chlorine monofluoride, without the aid of a catalyst. In the published art is a communication by the present inventors, entitled "Trifluoromethyl Hypochlorite," published in Chemical Communications, Number 23; p. 1,564 (December 1968), and a subsequent publication by the same authors in J. Am. Chem. Soc. 91 1,311 (1969). These publications disclose novel perfluoroalkyl hypochlorites prepared by a method described in the first of the above copending applications. A second publication, J. H. Prager et al., J. Am. Chem. Soc. 87 230 (1965), contains a background of the art of fluoroxy compounds.

SUMMARY OF THE INVENTION

The novel class of compounds of this invention includes the general class of fluoroalkyl hypochlorites having the formula:

$$R_3COCl$$

wherein R may be hydrogen, a lower alkyl, aryl, or a fluoro lower alkyl group, "lower alkyl" connoting alkyl of up to six carbons, with the proviso that at least one R is fluoroalkyl, and preferably perfluoroalkyl and at least one carbon-hydrogen bond is in the molecule. Thus, R can be $H-$; $CH_3-$; $C_2H_5-$; $C_3H_7-$;

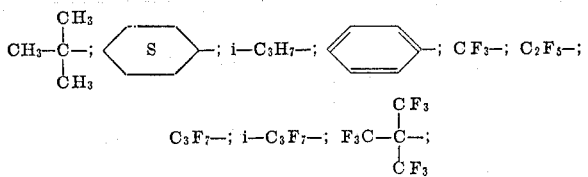

and the like.

The compounds of this invention are useful as initiators for the polymerization of unsaturated compounds and are valuable intermediates for the synthesis of other useful compounds; such as highly fluorinated ethers and esters having no fluorine in the alpha-position. They are also useful as sources of active chlorine for bleaches and as chlorinating agents. They may also be used as insecticides, for the fumes of these novel hypochlorites are toxic to insects.

The compounds of this invention react readily with carbon monoxide and with sulfur dioxide to yield the corresponding novel chloroformates and chlorosulfates respectively. Chloroformates are compounds useful as fumigants, catalysts for the polymerization of unsaturated compounds and in the preparation of polycarbonates, polyesters and formaldehyde polymers. Chlorosulfates are a class of compounds useful as intermediates in the preparation of halogenated ketones, carboxylic acids, esters, thiolesters, amides, aldehydes and polyesters.

An important distinction between the compounds of this invention and the corresponding non-fluorinated hypochlorites resides in the failure of the latter to react with carbon monoxide, even at elevated temperatures.

The novel hydrogen containing fluoroalkyl hypochlorites of this invention are prepared by reacting the corresponding fluoroalcohol with chlorine monofluoride (ClF) in a suitable closed container such as a stainless steel system, and may be represented by the following typical reaction:

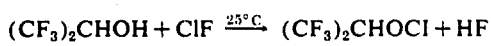

The method used for the preparation of these new compounds as shown above, is disclosed and claimed for the preparation of perfluoroinated hypochlorites and bihypochlorites, in co-pending application, Ser. No. 772,037, listed in "Cross References to Related Applications," supra. It is surprising, however, that this method is operable in the preparation of these novel hydrogen containing fluorohypochlorites, for it would be expected by one skilled in the art, that the C—H bond would not survive treatment with an oxidizing agent as strong as chlorine monofluoride. It is even more surprising that the synthesis of analogous chloroalkyl hypochlorites is not possible using this reactant. Furthermore, these novel fluoroalkyl hypochlorites containing at least one carbon-hydrogen bond cannot be prepared by the method disclosed in copending application, Ser. No. 734,515, supra, in view of the unavailability of the corresponding fluoroalkyl carbonyl starting materials.

DETAILED DESCRIPTION AND PREFERRED EMBODIMENTS

As can be seen from the formula above at least one of the R substituents in the hydrogen containing fluoroalkyl hypochlorites of this invention must be fluoroalkyl and the remaining R substituents can be either hydrogen, alkyl, or aryl. The alkyl and fluoroalkyl substituents are comprised of lower alkyl which, can be the same or different and can be cyclic or, straight or branched chain. The cyclic lower alkyl substituent can be cyclohexyl. The aryl substituent can be phenyl, benzyl, or tolyl.

A preferred class of compounds within the scope of this invention is that in which the fluoroalkyl moiety is perfluoroalkyl and which contain more fluorine atoms than hydrogen atoms in the molecule, although compounds having as little as about 30 percent fluorine based on the hydrogen atoms present are made possible by this invention. Generally, within the scope of this invention is included hydrogen containing fluoroalkyl hypochlorites which are prepared by the process as herein disclosed. Compounds having other halogen substitutes in place of fluorine are not preparable by the novel method herein described.

With the preferred class of compounds are those in which the R substituents are CF₃ and CH₃ or H, such as in formulas 1, 2, and 3 below:

(1) 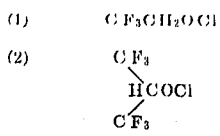  (3) 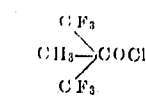

(2) 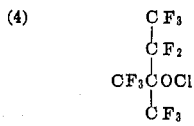

The following are illustrative of other compounds of this invention:

(4) 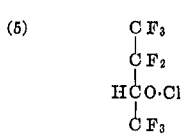   (8) 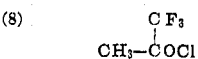

(5) 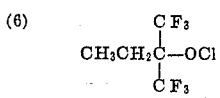   (9) 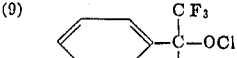

(6) 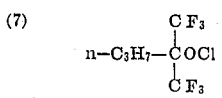   (10) 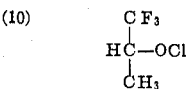

(7) (structure: n-C₃H₇-C(CF₃)(CF₃)OCl)

The compounds of this invention are prepared by reaction of the corresponding fluoroalcohol with chlorine monofluoride in the absence of a catalyst. The hydrogen containing fluoroalcohol starting materials are from a known class of compounds and may be purchased or prepared by known methods.

The reaction may be conducted in a closed system, such as is described in the appended examples, or in a flow system as is known in the art. The particular apparatus used is not critical to the novel reaction and is selected based upon the availability and the requirements of one skilled in the art. The apparatus, of course, must be constructed of an inert material such as stainless steel or a plastic, such as the polychlorotrifluoroethylene.

The reaction takes place readily at room temperature, however temperatures between about 0° to 50°C. can be used. There is no particular advantage in the use of higher or lower temperatures since the reaction readily takes place at room temperature, which is preferred. The optimum temperature for a particular reaction can be determined routinely.

Atmospheric, sub- or super-atmospheric pressures of up to 150 p.s.i.g. can be used successfully in the practice of this invention. The pressures developed in a system are autogenous and vary from one reaction to another and during a reaction.

An inert solvent, such as HF or CFCl₃, can be employed. The reaction can be carried out with the reactants in either the liquid, vapor or solid phase, where an appropriate inert solvent is employed.

In order to insure complete reaction, at least the stoichiometric amount, or preferably a slight excess, of the chlorine monofluoride reactant should be employed, although larger excesses will not deleteriously affect the reaction. The addition of less than the stoichiometric amount of ClF will, of course, decrease the yield of product.

The following examples are illustrative of specific embodiments and are not intended to limit the scope of the invention:

EXAMPLE 1

A 100 ml. stainless steel cylinder was charged with (CF₃)₂CHOH (10 mmoles) and excess ClF (12 mmoles) at −195°C. using conventional vacuum techniques in a Monel-nickel system under scrupulously dry conditions. The reactants were allowed to warm to room temperature and agitated for 24 hours. After this time, the absence of the characteristic —OH absorption in the infrared spectrum of the reaction product indicated that reaction has occurred.

The HF, excess ClF, and minor amounts of impurities were separated by fractionation between traps set at −80° and −196°C. The product, which was a pale yellow liquid, was recovered in almost quantitative yield from the −80° trap and analyzed as (CF₃)₂CH OCl. The Elemental Analysis was:

%C: Found, 17.65; Calcd, 17.78
%F: Found, 55.76; Calcd, 56.29
%Cl: Found, 17.50; Calcd, 17.53

EXAMPLE 2

A 100 ml. stainless steel cylinder was charged with (CF₃)₂(CH₃)COH (10 mmoles) and excess ClF (12 mmoles) at −195°C. using conventional vacuum techniques in a Monel-nickel system under scrupulously dry conditions. The mixture was allowed to warm to room temperature and react with shaking for 24 hours. After this time, the absence of the characteristic —OH absorption in the infrared spectrum of the product indicated that reaction had occurred.

The HF, excess ClF, and minor impurities were separated by fractionation between traps at −80° and −196°. The new product which was a pale yellow liquid was recovered from the −80° trap and identified as (CF₃)₂(CH₃)COCl, by elemental analysis, its infrared spectrum, and by its proton and fluorine-19 nmr spectra.

EXAMPLE 3

A 100 ml stainless steel cylinder was charged with CF₃CH₂OH (10 mmole) and excess ClF (12 mmoles) at −195°C. using conventional vacuum techniques in a Monel-nickel system under scrupulously dry conditions. The mixture was allowed to warm to room temperature and react with shaking for 24 hours. After this time, the absence of the characteristic —OH absorption in the infrared spectrum of the product indicated that reaction had occurred.

The HF, excess ClF, and minor impurities were separated by fractionation between traps at −80° and −196°. The new product, which was a pale yellow liquid was recovered from the −80° trap and identified as CF₃CH₂OCl, by elemental analysis, infrared spectrum and by proton and fluorine-19 spectra.

EXAMPLE 4

2-Phenyl-hexafluoroisopropanol (5 mmol) was syringed into a 10 cc rigid inert plastic reaction tube made of polychlorotrifluoroethylene in a dry box. The reactor was capped with a stainless steel valve and the dry nitrogen was evacuated from the tube on a vacuum line. Excess chlorine monofluoride (7 mmol) was added to the reactor at −196°C. and the contents were allowed to warm to 25°C. The mixture was then agitated on a mechanical shaker for 24 hours. At the end of this reaction period, the volatile materials (HF reaction product, excess ClF, and minor impurities) were pumped from the reaction tube at 0° leaving in the reaction vessel the pale yellow hypochlorite, $C_6H_5(CF_3)_2COCl$.

EXAMPLE 5

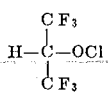

(10 mmol) was contacted with CO(15 mmol) at 0° for 6 hours in a stainless steel reaction cylinder. A reaction of the materials took place to yield the chloroformate, $(CF_3)_2CHOC(O)Cl$. The chloroformate was isolated by standard vacuum line fractionation and was a clear, colorless liquid. It was characterized by its elemental analysis, its infrared spectrum, and by its nmr spectrum.

EXAMPLE 6

$(CF_3)_2(CH_3)COCl$(10 mmol) was contacted with CO(12 mmol) in a stainless steel reaction cylinder. The materials were mechanically agitated for 24 hours at 25°. The resulting product was $(CF_3)_2(CH_3)COC(O)Cl$, the chloroformate. The clear colorless liquid was isolated and characterized as above.

EXAMPLE 7

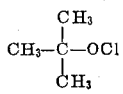

was contacted with CO under the same conditions described in examples 5 and 6. No reaction takes place over a 24 hour period. The reaction temperature was raised to 80°C. and still no reaction took place.

We claim:

1. Compound of the formula $R_3COCl$ wherein each R is independently selected from the group consisting of hydrogen, $C_1$ to $C_6$ alkyl, $C_1$ to $C_6$ fluoroalkyl, cyclohexyl, phenyl, benzyl, and tolyl, with the provisos that at least one R substituent be fluoroalkyl and at least one R substituent contain hydrogen.

2. Compound in accordance with claim 1 wherein the total number of fluorine atoms present therein is at least 30 percent based on the number of hydrogen atoms present.

3. Compound in accordance with claim 2 wherein said compound contains more fluorine atoms than hydrogen atoms.

4. Compound in accordance with claim 1 wherein said fluoroalkyl substituent is perfluoroalkyl.

5. Compound in accordance with claim 1 wherein at least one of said R substituents is methyl and at least one other R substituent is trifluoromethyl.

6. Compound in accordance with claim 1 wherein at least one of said R substituents is hydrogen and at least one other R substituent is trifluoromethyl.

7. Compound in accordance with claim 1 wherein at least one of said R substituents is phenyl.

8. The compound of claim 1 which is $(CF_3)_2CHOCl$.

9. The compound of claim 1 which is $(CF_3)_2(CH_3)COCl$.

10. The compound of claim 1 which is $CF_3CH_2OCl$.

11. The compound of claim 1 which is $C_6H_5(CF_3)_2COCl$.

12. A process comprising reacting a compound of the formula $R_3COH$ wherein R is as defined in claim 1 with at least a stoichiometric amount of chlorine monofluoride in the absence of catalyst at a temperature ranging from about 0° to about 50°C.

13. A process in accordance with claim 12 wherein said temperature is ambient and said chlorine monofluoride is present in a stoichiometric excess.

* * * * *